Oct. 16, 1928.
W. PÚLZ
WEIGHING MACHINE
Filed Sept. 28, 1923
1,687,852
2 Sheets-Sheet 1
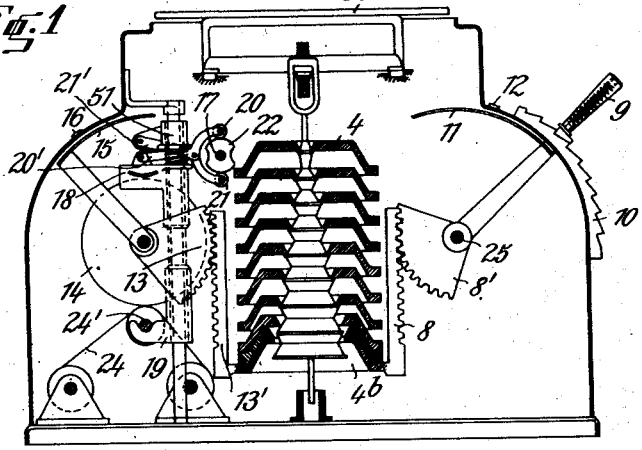
Fig. 1
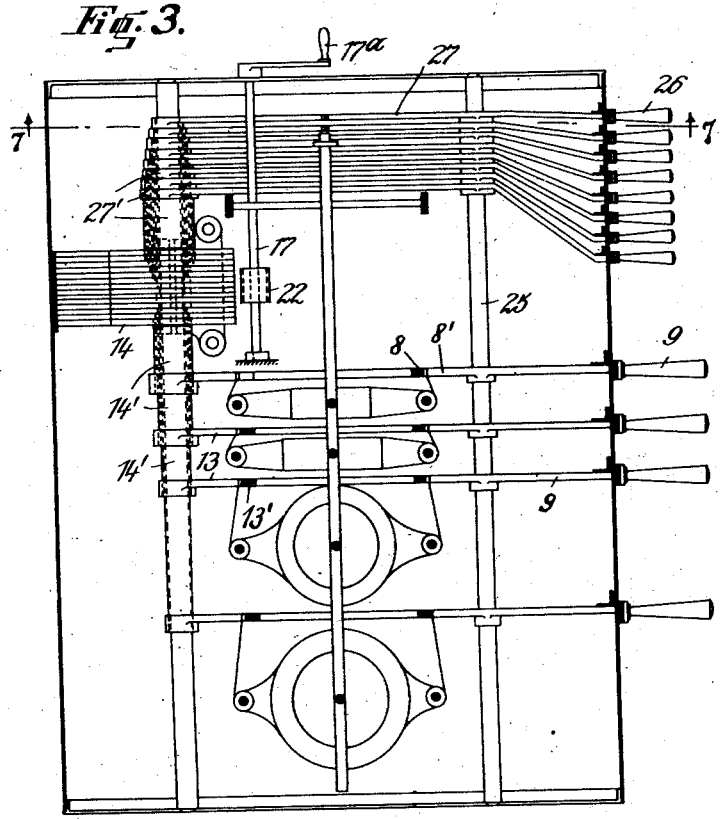
Fig. 3.
Inventor:
Willy Púlz
by 
Attorney Oct. 16, 1928.
W. PÜLZ
1,687,852
WEIGHING MACHINE
Filed Sept. 28, 1923  2 Sheets-Sheet 2
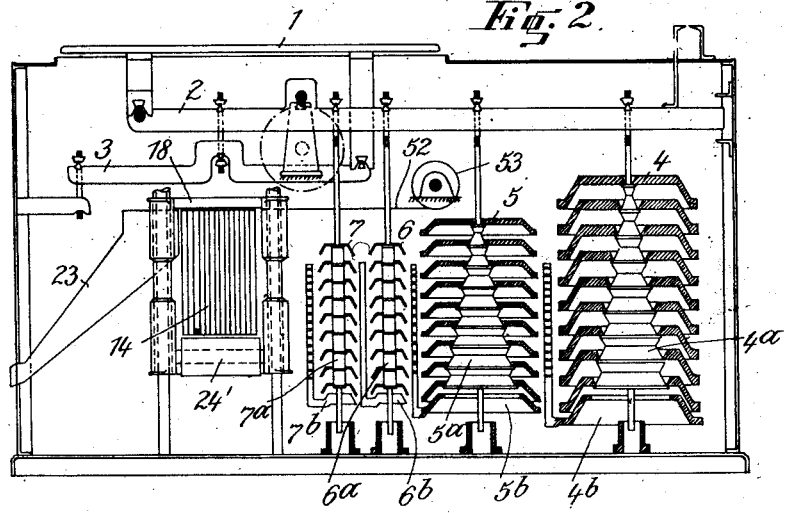
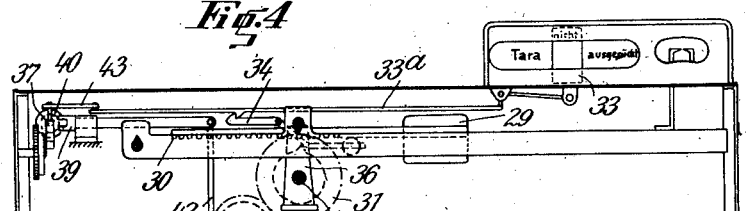
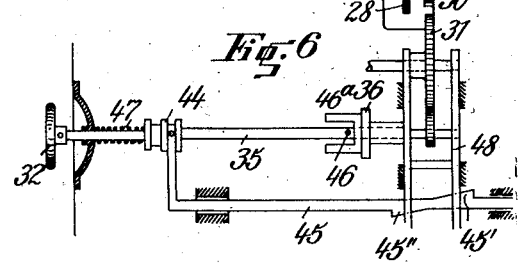
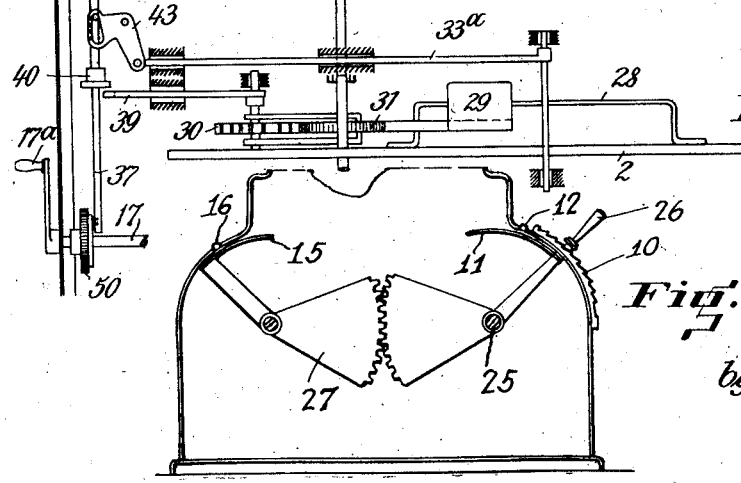

Patented Oct. 16, 1928.

1,687,852

UNITED STATES PATENT OFFICE.

WILLY PÜLZ, OF BERLIN-NIEDERSCHONHAUSEN, GERMANY.

WEIGHING MACHINE.

Application filed September 28, 1923, Serial No. 665,362, and in Norway May 5, 1923.

My invention relates to weighing machines and more especially to the type of machine in which the load is balanced by the addition or subtraction of weights of different size. It is an object of my invention to provide a machine of this kind which at the same time registers and records by printing the weight and which allows of ascertaining whether the weight of the container enclosing the goods to be weighed, has been accounted for or not. Further objects of my invention will appear as the specification proceeds.

In the drawings affixed to this specification and forming part thereof a machine embodying my invention is illustrated diagrammatically by way of example. In the drawings:

Fig. 1 is a vertical transverse section,

Fig. 2 is a vertical longitudinal section,

Fig. 3 is a plan view partly in horizontal section,

Fig. 4 is a side view of part of the apparatus,

Fig. 5 is a plan view corresponding to Fig. 4 and

Fig. 6 shows a detail.

Fig. 7 is a cross-section on the line VII—VII in Fig. 3.

Referring to the drawing the load to be weighed is placed on the pan 1 supported by a system of scale beams 2, 3. The longer arm of the scale beam 2 extends above a plurality of sets of weights 4, 5, 6, 7, carried by hangers $4^a$, $5^a$, $6^a$, $7^a$. The weights in each set are equal in weight and the weights of the several sets increase in weight from the fulcrum to the free end of the beam. The several weights can be lifted off or deposited on the hangers $4^a$ to $7^a$ by means of lifting plates $4^b$, $5^b$, $6^b$, $7^b$, which are operated by racks 8 and segments 8', the segments being moved by means of levers 9 projecting from the machine.

Instead of the segments and racks other members for effecting the movement may be used, for example levers with slots and guide ways.

Individual levers 9 are held fast in their several positions by toothed segments 10. Upon the levers 9 are provided scales 11 carrying figures which correspond to the weights of the sets 4, 5, 6, 7, which are moved into or out of operation by the movement of the lever 9, and these figures may be read through an observation opening 12 in the casing. After the levers have been adjusted in the segments 10 the sets of weights are free to act on the beam.

The lifting plates $4^b$, to $7^b$ are provided each with a second rack 13' which engage with segments 13. Coupled to these segments 13 are printing discs 14, so that when the lever 9 is adjusted the printing device is set simultaneously. The type discs 14 are likewise provided with segments 15 carrying figures so that also on the other side of the casing the weight ascertained can be read off through the opening 16.

The modification illustrated in the drawing shows a double ticket printing apparatus so that a printed card is delivered to the purchaser, a second imprint being produced upon a paper strip for control purposes by rotating a crank $17^a$ on the side of the casing. The operation of printing the weight is as follows:

On crank $17^a$ being turned 180° two printing blocks 18 and 19, which have a scissor-like movement, are set in motion by the rollers 20, 21 engaging in recesses in the disc 22 mounted on the crank shaft 17. This causes the rollers 20, 21, to approach one another so that the scissor arms 20', and 21' which are connected to one another and carry the rollers 20 and 21 swing outwards. The free end of arm 21 moves upwards and carries with it the sleeve 51 connected with the printing block 19 by a hollow shaft. The free end of arm 20' in descending presses the printing block 18 downwards. In this manner the two blocks 18 and 19 engage with the type disc 14. On further rotation of the crank $17^a$ the printing blocks are again removed from the type discs 14 and the rest of the movement of the crank is used for cutting off the printed card or for feeding the paper strip (this operation is not illustrated).

The double ticket printing apparatus is so devised that a single paper strip 52 passes off a reel 53 (Fig. 2) across the type discs 14. The printed card cut off this strip is ejected through a shoot 23, while the second print is effected upon a strip 24 extending across a roller 24', this strip remaining in the machine to serve as a check.

In order that the figures may be printed in the correct order and may be correctly read off at the point 16 the type discs 14 with the scales 15 secured thereto are connected with segments 13 by means of hollow shafts 14' inserted one in the other.

The indicating mechanism comprises segment levers 26 mounted on the same shaft 25 upon which the weight adjusting levers 9 are mounted and likewise engaging in racks. Transmission segments 27 which are connected by means of hollow shafts 27' with the type discs 14 provide, in the same manner as described with reference to the adjustment of the weights, for the setting of the figures to be printed upon the ticket printing apparatus. The price to be paid can thus be printed simultaneously with and alongside of the weight. The operation of one of the hand levers 9 does not in any way affect the transmission members of the levers 26, and vice versa; for the hollow shafts 14' and 27' which serve for the transmission are not rigidly connected with the corresponding type discs 14, but only engage with these upon a predetermined displacement of the particular lever 9 or 26, the engagement being effected in each case by a stop. Observation openings 12 and 16 allow reading the amount to be paid as well as the weight ascertained.

By means of the hollow shafts the weighing machine can be connected with adding and multiplying mechanism.

There is further provided a separate mechanism for determining the tare weight. On the scale beam 2 is secured a bar 28 (Figs. 4 and 5) carrying a sliding weight 29 displaceable from the outside by means of rack 30, gear wheel 31 and handle 32. The point of contact of the gear wheel mounted on a fixed spindle with the movable rack coincides with the fulcrum of the scale beam so that this beam is not influenced thereby.

In order to make it possible for the seller and the purchaser to ascertain whether the tare weight has been moved an indicating device is connected with the tare weight moving mechanism. If the tare weight is in the zero position the rod 33ª moves the plate 33 so that the words "Tare disengaged" can be read. This rod 33ª is held in the zero position by a pawl 34. As soon as the tare weight 29 is moved a cam disc 36 mounted on the tare shaft 35 raises the pawl 34 and the plate 33 moves downwards, forming the legend "Tare not disengaged".

The gear wheel 31 (Fig. 6) which serves for moving the weight 29 is mounted in a sliding casing 48, the movement of which is controlled as follows. Before the tare weight 29 can be moved the hand wheel 32 which serves for this purpose with the shaft 35 must be pulled out against the action of a spring 47 and takes with it a rod 45 connected to it by a collar 44. The rod 45 has cam faces upon which the sliding casing 48 rests. When the handle 32 is pulled the casing 48 is pressed upwards by the right hand cam face 45', until the toothed wheel 31 engages the rack 30. As soon as the tare weight 29 has been adjusted and the handle 32 is released, the shaft 35 and with it the bar 40 move back under the action of the spring 47, and the bar 45 by means of the cam face 45'' disengages the wheel 31 from the rack 30. In order that the cam disc 36 (Figs. 4 and 6) may not move with the sliding shaft 35 it is mounted to slide thereon and has a connecting slot 46ª and is controlled by a pin 46 fixed on the shaft 35. When the shaft is reciprocated it slides in this slot. In order to prevent the printing of a given weight when the tare is not disengaged there is provided on the crank shaft 17 (Figs. 4 and 5) a locking wheel 50 in which engages a locking rod 37. The printing crank 17ª can only be actuated when pressure is applied to the knob 38 of the locking rod 37, this being possible only if the tare weight 29 is in the zero position. If the tare weight 29 is displaced a locking slide 39 is at once moved in front of a stop 40 on the rod 37. This locking action is effected by means of a second cam disc 41 (Fig. 4) which actuates an angle lever 42 as soon as the tare weight 29 starts moving. The locking rod 37 is also employed for returning the plate 33 into the zero position whenever it has been lowered in order to cancel the tare weight. For this purpose a rod 33ª is connected with an angle lever 43 which engages with the rod 37 by means of a pin and slot connection.

I wish it to be understood that I do not desire to be limited to the exact details of construction shown and described, for obvious modifications will occur to a person skilled in the art.

I claim:—

1. A weighing machine comprising a scale beam, a plurality of sets of superimposed weights capable of acting on different points of said beam, the weights in one set being equally heavy, the weights in the set acting on the point of the beam remotest from the fulcrum being heavier than those nearest the fulcrum, means for gradually bringing the weights of one set into and out of cooperation with said beam and registering and recording mechanism operatively associated with said latter means.

2. A weighing machine comprising a scale beam, a plurality of sets of superimposed weights capable of acting on different points of said beam, the weights in one set being equally heavy, the weights in the set acting on the point of the beam remotest from the fulcrum being heavier than those nearest the fulcrum, means for gradually bringing the weights of one set into and out of cooperation with said beam, registering and recording mechanism operatively associated with said latter means, a separate weight for the tare and means for indicating the operative condition of said separate weight.

3. A weighing machine comprising a scale beam, a plurality of sets of weights, means for placing the weights in each set successively in or out of operation and registering and recording mechanism operatively associated with said means, said mechanism comprising two paper strips, means for printing the weight on either strip and means for severing a ticket from one of said strips.

4. A weighing machine comprising a scale beam, a plurality of sets of weights, means for placing the weights in each set successively in or out of operation and registering and recording mechanism operatively associated with said means, said mechanism comprising a plurality of type wheels, printing blocks disposed in diametrically opposite positions near said wheels, means for simultaneously forcing said blocks against the circumference of said wheels and means for carrying a paper strip to pass between each block and said wheels.

5. A weighing machine comprising a scale beam, a plurality of sets of weights, means for placing the weights in each set successively in or out of operation and registering and recording mechanism operatively associated with said means, said mechanism comprising a plurality of type wheels, printing blocks disposed in diametrically opposite positions near said wheels, toggle levers for simultaneously forcing said blocks against the circumference of said wheels and means for carrying a paper strip to pass between each block and said wheels.

6. A weighing machine comprising a balance, a plurality of sets of weights, means for placing the weights in each set successively in or out of operation, registering and recording mechanism operatively associated with said means, figure-indicating means adjacent said weight-registering mechanism and therefore adapted for simultaneous reading and separate manually operable means for actuating said figure-indicating means.

7. A weighing machine comprising a balance, a plurality of sets of weights, means for placing the weights in each set successively in or out of operation, registering and recording mechanism operatively associated with said means, figure-indicating means adjacent said weight-registering mechanism and therefore adapted for simultaneous reading, separate manually operable means for actuating said figure-indicating means and scales connected with said recording mechanism and said figure-indicating means.

8. A weighing machine comprising a scale beam, a plurality of sets of weights, means for placing the weights in each set successively in or out of operation, registering and recording mechanism operatively associated with said means, a separate weight for balancing the tare, means for indicating the operative condition of said weight and means for disconnecting said indicating means.

9. A weighing machine comprising a scale beam, a plurality of sets of weights, means for placing the weights in each set successively in or out of operation, registering and recording mechanism operatively associated with said means, a separate weight for balancing the tare, means for indicating the operative condition of said weight and means for preventing said mechanism from operating until said tare balancing weight has been carried into its zero position.

In testimony whereof I affix my signature.

Dr. WILLY PULZ.